United States Patent
Knoerzer (10) Patent No.: US 11,801,959 B2
(45) Date of Patent: Oct. 31, 2023

(54) CONTAINER FOR USE IN FOOD PROCESSING

(71) Applicant: COMMONWEALTH SCIENTIFIC AND INDUSTRIAL RESEARCH ORGANISATION, Australian Capital Territory (AU)

(72) Inventor: Kai Knoerzer, Victoria (AU)

(73) Assignee: COMMONWEALTH SCIENTIFIC AND INDUSTRIAL RESEARCH ORGANISATION

( * ) Notice: Subject to any disclaimer, the term of this patent is extended or adjusted under 35 U.S.C. 154(b) by 536 days.

(21) Appl. No.: 15/754,763

(22) PCT Filed: Aug. 26, 2016

(86) PCT No.: PCT/AU2016/050801
§ 371 (c)(1),
(2) Date: Feb. 23, 2018

(87) PCT Pub. No.: WO2017/031552
PCT Pub. Date: Mar. 2, 2017

(65) Prior Publication Data
US 2018/0251250 A1    Sep. 6, 2018

(30) Foreign Application Priority Data
Aug. 26, 2015   (AU) ................... 2015903447

(51) Int. Cl.
*B65B 55/14*   (2006.01)
*B65B 25/00*   (2006.01)
(Continued)

(52) U.S. Cl.
CPC ............ *B65B 55/14* (2013.01); *A23L 3/0155* (2013.01); *A23L 3/10* (2013.01); *B32B 1/02* (2013.01);
(Continued)

(58) Field of Classification Search
None
See application file for complete search history.

(56) References Cited

U.S. PATENT DOCUMENTS 5,165,974 A   11/1992   Odaka et al.
5,178,293 A   1/1993    Suzuki et al.
(Continued)

FOREIGN PATENT DOCUMENTS

KR   10-2004-0100244   12/2004
WO   1997/11838        4/1997
(Continued)

OTHER PUBLICATIONS

EngineeringToolbox, Plastics-Thermal Conducitivity Coefficients, accessed Mar. 2, 2020 <https://www.engineeringtoolbox.com/thermal-conductivity-plastics-d_1786.html> (Year: 2020).*
(Continued)

*Primary Examiner* — Viren A Thakur
*Assistant Examiner* — Thanh H Nguyen
(74) *Attorney, Agent, or Firm* — LADAS & PARRY LLP (57) ABSTRACT

A multilayer container for elevated temperature, high pressure processing of a material within the container, using a pressure transmission liquid within the container, the multilayer container having a container wall having an inner layer formed of a plastic for containing the liquid in contact with the inner side thereof and at least one further layer outboard of the inner layer and formed of different plastic from the inner layer, wherein the inner layer has a compression heating coefficient at least as high as the compression heating coefficient of the pressure transmission liquid in contact with the inner side thereof and the at least one further layer has a lower thermal conductivity at ambient pressure and temperature than the inner layer.

18 Claims, 5 Drawing Sheets

(51) Int. Cl.
  *A23L 3/015* (2006.01)
  *A23L 3/10* (2006.01)
  *B65B 55/12* (2006.01)
  *B65D 81/00* (2006.01)
  *B32B 1/02* (2006.01)
  *B32B 27/32* (2006.01)
  *B32B 33/00* (2006.01)
  *B65D 81/18* (2006.01)

(52) U.S. Cl.
  CPC ............ *B32B 27/322* (2013.01); *B32B 33/00* (2013.01); *B65B 25/001* (2013.01); *B65B 55/12* (2013.01); *B65D 81/00* (2013.01); *B65D 81/18* (2013.01); *B32B 2307/30* (2013.01); *B32B 2323/043* (2013.01); *B32B 2323/10* (2013.01); *B32B 2327/18* (2013.01); *B32B 2439/40* (2013.01)

(56) References Cited

U.S. PATENT DOCUMENTS

| | | |
|---|---|---|
| 5,316,603 A | 5/1994 | Akazawa et al. |
| 5,319,910 A | 6/1994 | Takata et al. |
| 2002/0192109 A1 | 12/2002 | Ting et al. |
| 2004/0071842 A1* | 4/2004 | Van Schepdael ..... A23L 3/0155 426/281 |
| 2004/0123745 A1* | 7/2004 | Zacche' .................... A61L 2/02 99/403 |
| 2006/0180036 A1* | 8/2006 | Lonneborg ............ A23L 3/0155 100/213 |
| 2006/0292274 A1* | 12/2006 | Garwood .................. A23B 4/16 426/335 |
| 2007/0292646 A1 | 12/2007 | Safian et al. |
| 2013/0248411 A1 | 9/2013 | Bader et al. |
| 2014/0186499 A1 | 7/2014 | Hukelmann et al. |

FOREIGN PATENT DOCUMENTS

| | | |
|---|---|---|
| WO | 1997/32708 | 9/1997 |
| WO | 2004/082405 A1 | 9/2004 |

OTHER PUBLICATIONS

KR 10-2004-0100244 _ English Abstract.

* cited by examiner

CONTAINER FOR USE IN FOOD PROCESSING

RELATED APPLICATION INFORMATION

This application is a 371 of International Application PCT/AU2016/050801 filed 26 Aug. 2016, which claims priority from AU 2015903447 filed 26 Aug. 2015, the contents of which are incorporated herein by reference.

TECHNICAL FIELD

The invention relates to a container and system for use in elevated temperature, high pressure processing and to a process of elevated temperature high pressure processing using the container.

Background of Invention

High pressure processing (HPP) is a mature technology, with its main application in cold preservation of food (e.g., beverages), i.e., for the inactivation of vegetative organisms caused by pressure instead of temperature. HPP alone is not able to inactivate bacterial spores. Conventional canning produces safe but low-quality products due to the need to significantly overheat the outside of cans for an extended period to ensure adequate heat treatment of the centre.

The use of high pressure high temperature processing has several advantages over conventional thermal processing. These include reduced thermal load due to fast compression heating (i.e., the increase of temperature in the processed material caused by pressurisation) of the food material during pressure come up and fast decompression cooling (i.e., the reverse of compression heating) during pressure release. It has been shown that microbial spores show synergistic inactivation when pressure and temperature are combined. As a result, lower temperatures are required to achieve the same extent of inactivation, or shorter process times at temperatures identical to thermal-only inactivation are required. This reduces the thermal load further, which is beneficial to retain the food's quality characteristics, such as flavour, aroma, colour, nutrients etc.

To date, in order to perform such a high pressure thermal process, purpose-designed high pressure machines have to be used, which are capable of heating the compression fluid and the vessel walls. A typical maximum temperature that is achievable in lab- and pilot-scale systems is <100° C. This temperature is sufficient for some applications, but for sterilisation, which is usually performed at ~121° C., is still too low.

To date, there is no commercial HPP system available, which can combine pressures and elevated temperatures. It is desirable to allow high pressure thermal processing without the need for heating in the high pressure vessel, be it through a heated high pressure vessel wall or an internal heater in the container; such heating could be realised by ohmic, electrical, convection or other processes, to maintain the temperature during the process. If such a heater system were available, temperature gradients would tend to develop during high pressure thermal processing in a heated high pressure vessel as a result of the different materials involved including the material to be heated such as a food, the processing liquid and the high pressure vessel material which is generally metal, as well as temperature losses during pressure hold time due to convection and conduction.

There is a need for a more efficient and controllable system for high pressure, high temperature processing to allow uniform high pressure and temperature treatment suitable for commercial scale processing of materials such as food products.

SUMMARY OF INVENTION

We provide a multilayer container for elevated temperature, high pressure processing of a material within the container, using a pressure transmission liquid within the container, the multilayer container having a container wall comprising an inner layer formed of a plastic for containing the liquid in contact with the inner side thereof and at least one further layer outboard of the inner layer and formed of different plastic from the inner layer, wherein the inner layer has a compression heating coefficient at least as high as the compression heating coefficient of the pressure transmission liquid in contact with the inner side thereof and the at least one further layer which has a lower thermal conductivity than the inner layer.

In one set of embodiments the at least one further layer has a thermal conductivity of no more than $0.35 \text{ W·m}^{-1} \text{ K}^{-1}$, preferably no more than $0.3 \text{ W·m}^{-1} \text{ K}^{-1}$ and more preferably $0.26 \text{ W·m}^{-1} \text{ K}^{-1}$, at 25° C. The thermal conductivity of plastic is a measure of the heat transmitted through a unit thickness of the material, in a direction normal to the surface of unit area due to a temperature gradient. Examples of plastics having a thermal conductivity of no more than 0.3 W/(m K), preferably no more than 0.26 W/(m K), at 25° C. may, for example be selected from the group consisting of polyester, phenolic resin, nylon, polycarbonate, natural rubber, synthetic rubber, thermoplastic elastomers, polymethylmethacrylate, polypropylene, halogenated polyolefins such as polyvinyl chloride and polytetrafluoroethylene (PTFE), polyimides and acrylics.

We have found that the compressibility of plastics used in the outboard layer has significant influence on the thermal conductivity under high pressure. Accordingly, the at least one further layer outboard of the inner layer will typically also have a lower compressibility than the inner layer of the container wall.

There is further provided a system for high temperature high pressure processing of a material comprising a container as herein described and a pressure transmission liquid and the material within the container.

In a further aspect there is provided a process for high pressure thermal processing of a material comprising;
 (i) Providing a multilayer container as described above;
 (ii) Providing a liquid pressure transmission liquid;
 (iii) Preheating the multilayer container, pressure transmission liquid and material;
 (iv) Placing the material to be processed within the container and providing the pressure transmission liquid within the container, in association with the material, for applying pressure to the material; and
 (v) Applying pressure to the pressure transmission liquid within the container;
 wherein the inner layer provides compression heating to the pressure transmission liquid and the at least one further layer reduces heat loss from the container through low thermal conductivity (thermal insulation).

The multilayer container, pressure transmission medium and material are preferably preheated to a temperature that will yield a target temperature in the material to be processed in the range of 40° C. to 150° C. and the pressure applied is in the range of from 100 to 1000 MPa. More preferably the multilayer container, pressure transmission liquid and material are preheated to a temperature yielding a process temperature under pressure in the range of from 50° C. to 130° C. and the pressure applied is in the range of from 300 to 800 MPa.

The container and process allow the use of standard (i.e., cold) HPP machines, which will allow uniform processing (with respect to pressure and temperature) at elevated temperatures without the requirement for specialised HPP equipment such as an internal heater for providing heating of the container contents during thermal high pressure processing. Further the efficient regulation of temperature throughout the pressure transmission liquid during high pressure processing allows shorter period of heating and/or lower temperatures than have heretofore been required in thermal-only processing. This has significant benefits in the treatment of food products for which shorter processing times and less severe conditions allow greater processing efficiency and for the quality of the food to be more effectively retained.

Detailed Description

The inner layer of the container has a compression heating coefficient of at least as high as the pressure transmission liquid in contact with the inner side thereof. Where used herein, the reference to the compression heating coefficient or reference to compression heating coefficient relative to another material (such as the pressure transmission liquid) refers to the compression heating coefficient or relative coefficients determined at ambient pressure and temperature (25° C.). The relative coefficients generally speaking are consistent at ambient temperature with the relative coefficients of the materials under conditions of operation of the system and process. Generally, it will be understood that the choice of plastic material for the inner layer will also involve choosing a plastic material having a melting point higher than the operating temperature. Thus, in general, the plastic will have a melting point of more than 60° C., preferably more than 90° C., and more preferably at least 120° C.

The compression heating coefficient of any material may be determined according to the following equation:

$$k_c = f(P, T) = \frac{\alpha_p(P, T)}{\rho(P, T) \cdot C_p(P, T)}$$

where T denotes the absolute temperature in K, P the pressure in Pa, $k_c$ the compression heating coefficient in $Pa^{-1}$, $\alpha_p$ the thermal expansion coefficient in $K^{-1}$, $\rho$ the density in kg $m^{-3}$ and $C_p$ the specific heat capacity in J $kg^{-1}$ $K^{-1}$.

A specific procedure for determining the compression heating coefficient of materials under the conditions of operation of the system is set out by Knoerzer et al Journal of Food Engineering 98 (2010) 110-119 and Knoerzer et al Journal of Food Engineering 96 (2010) 229-238 as a function of pressure and temperature, and dependent on thermal expansion coefficient, density and specific heat capacity of the pressurised material. To determine the compression heating coefficient, the material to be investigated is preheated to a certain temperature, then pressure is applied in the order of 700-800 MPa. At this pressure level, the process is held until temperatures across the material to be tested, as measured by thermocouples, are equal. Then the pressure is released within a short time and the pressures and temperatures are recorded. This recorded pressure/temperature profile is then evaluated regarding the slope at different pressure levels, and through equation 3 in the above-mentioned publication the compression heating coefficient is derived for respective pressure and temperature levels. This process is repeated for different initial temperatures (yielding different temperatures under pressure) until sufficient data is collected that allows two-dimensional fitting, yielding an equation for the compression heating properties as function of pressure and temperature combination. While this process may be used to confirm the efficiency of the process and the behaviour of the material over a wide range of pressures and temperatures, the plastic materials may be selected having regard to the compression heating coefficient at atmospheric pressure and ambient temperature (25° C.).

Thermal conductivity can be defined as the quantity of heat transmitted through a unit thickness of a material—in a direction normal to a surface of unit area —due to a unit temperature gradient under steady state conditions. Tables of thermal conductivity of common materials at ambient pressures are readily available such as in the Engineering Toolbox (www.EngineeringToolBox.com) or online material database www.matbase.com.

Compressibility where referred to herein is a measure of the relative volume change of a solid as a response to a pressure (or mean stress) change. Compressibility values may be calculated from readily available information on density and speed of sound for specific materials where compressibility ($\beta_s$) can be expressed as:

$$\beta_S = \frac{1}{\rho c^2}$$

where $\rho$ is the density and c is the speed of sound.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

BRIEF DESCRIPTION AT DRAWINGS

In the drawings:

FIG. 2 shows a longitudinal section of a system for high pressure thermal processing in accordance with the invention comprising a multilayer container in accordance with FIG. 1 housed in a pressure vessel which may be of known type for HPP.

The invention provides a multilayer container and system for elevated temperature, high pressure processing of a material within the container, using a pressure transmission liquid within the container, the multilayer container having a container wall comprising an inner layer formed of a plastic for containing the liquid in contact with the inner side thereof and at least one further layer outboard of the inner layer and formed of different plastic from the inner layer, wherein the inner layer has a coefficient of compression heating at least as high as the pressure transmission liquid in contact with the inner side thereof, i.e., undergoing at least the same compression heating at the specific pressure level, and at least one further layer has a lower compressibility and, therefore, lower thermal conductivity under pressure, than the first layer.

The inner layer of the container wall has a compression heating coefficient at least as high as the compression heating coefficient of the pressure transmission liquid in contact with the inner side thereof. In operation of the container during elevated temperature high pressure processing, this results in either avoiding a temperature gradient which may lead to heat loss from the pressure transmission liquid to the layer, or if the compression heating coefficient of the inner layer is greater than the pressure transmission liquid the container will provide heat from the layer to the liquid during high pressure processing.

In one set of embodiments the compression heating coefficient ($k_C$) of the inner layer is at least $6.2 \times 10^{-11}$ Pa$^{-1}$ at ambient temperature and pressure, preferably at least $8 \times 10^{-11}$ Pa$^{-1}$ at ambient temperature and pressure. The compression heating coefficient (at 25° C. and ambient pressure) of a series of readily available plastics (and water) is shown in Table 1.

TABLE 1

| Material | Thermal expansion coefficient (K$^{-1}$) | Specific heat capacity (J · kg$^{-1}$ · K$^{-1}$) | $k_C$ (Pa$^{-1}$) |
| --- | --- | --- | --- |
| Water | 2.6 10$^{-04}$ | 4181 | 6.2 10$^{-11}$ |
| PTFE | 1.3 10$^{-04}$ | 1000 | 5.9 10$^{-11}$ |
| PP | 1.5 10$^{-04}$ | 1800 | 8.8 10$^{-11}$ |

TABLE 1-continued

| Material | Thermal expansion coefficient (K$^{-1}$) | Specific heat capacity (J · kg$^{-1}$ · K$^{-1}$) | $k_C$ (Pa$^{-1}$) |
| --- | --- | --- | --- |
| HDPE | 2.0 10$^{-04}$ | 1900 | 1.1 10$^{-10}$ |
| PVC | 8.5 10$^{-05}$ | 1250 | 4.8 10$^{-11}$ |
| PMMA | 7.5 10$^{-05}$ | 1450 | 4.4 10$^{-11}$ |
| Polycarbon | 6.6 10$^{-05}$ | 1200 | 4.6 10$^{-11}$ |
| ABS | 1.0 10$^{-04}$ | 1400 | 6.9 10$^{-11}$ |
| PEEK | 5.5 10$^{-05}$ | 1340 | 3.1 10$^{-11}$ |
| PET | 5.9 10$^{-05}$ | 1000 | 4.2 10$^{-11}$ |
| PES | 5.6 10$^{-05}$ | 1100 | 3.7 10$^{-11}$ |
| PI | 5.0 10$^{-05}$ | 1090 | 3.2 10$^{-11}$ |
| PVDF | 1.1 10$^{-04}$ | 1200 | 5.1 10$^{-11}$ |
| PFA | 1.4 10$^{-04}$ | 1000 | 6.5 10$^{-11}$ |

The thermal conductivity of the at least one further layer outboard of the inner layer is generally no more than 0.33 W·m$^{-1}$ K$^{-1}$, preferably no more than 0.3 W·m$^{-1}$ K$^{-1}$, and more preferably no more than 0.26 W·m$^{-1}$ K$^{-1}$ at 25° C. In a particularly preferred embodiment the thermal conductivity of the at least one further layer outboard of the inner lay-r is no more than 0.2 W·m$^{-1}$ K$^{-1}$ at 25° C.

The at least one container layer outboard of the inner layer preferably has a lower compressibility than the inner layer. The lower compressibility will assist in providing lower thermal conductivity than the inner layer under pressure. The compressibility of the at least one layer outboard of the inner layer is preferably no more than $2.5 \times 10^{-10}$ Pa$^{-1}$. In one set of embodiments the compressibility is no more than $2 \times 10^{-10}$ Pa$^{-1}$.

The combination of low compressibility and low thermal conductivity will typically provide good thermal insulation during pressure hold time to counteract potential heat losses (due to significant temperature gradient) towards the cool high pressure vessel walls and material such as a pressurisation liquid surrounding the container.

The compressibility and thermal conductivity (at 25° C. and ambient pressure) of a number of readily available plastics (and water) is shown in Table 2.

TABLE 2

| Material | Density (kg · m$^{-3}$) | Speed of sound (m · s$^{-1}$) | Compressibility (Pa$^{-1}$) | Thermal conductivity (W · m$^{-1}$ · K$^{-1}$) |
| --- | --- | --- | --- | --- |
| Water | 1000 | 1482 | 4.6 10$^{-10}$ | 0.6 |
| PTFE | 2200 | 1400 | 2.3 10$^{-10}$ | 0.25 |
| PP | 950 | 2400 | 1.8 10$^{-10}$ | 0.2 |
| HDPE | 930 | 1900 | 3.0 10$^{-10}$ | 0.5 |
| PVC | 1420 | 2395 | 1.2 10$^{-10}$ | 0.19 |
| PMMA | 1180 | 3350 | 7.6 10$^{-11}$ | 0.2 |
| Polycarbon | 1200 | 2270 | 1.6 10$^{-10}$ | 0.19 |
| ABS | 1040 | 2250 | 1.9 10$^{-10}$ | 0.17 |
| PEEK | 1320 | 2580 | 1.1 10$^{-10}$ | 0.15 |
| PET | 1400 | 2400 | 1.2 10$^{-10}$ | 0.15 |
| PES | 1370 | 2300 | 1.4 10$^{-10}$ | 0.13 |
| PI | 1420 | 2500 | 1.1 10$^{-10}$ | 0.2 |
| PVDF | 1780 | 2560 | 8.6 10$^{-11}$ | 0.1 |

Examples of suitable materials having the required thermal conductivity and compressibility for the layer outboard of the inner layer include at least one plastic selected from the group consisting of polyester, nylon, polycarbonate, natural rubber, synthetic rubber such as ABS, phenolic resin, polyethylene terephthalate (PET), polyether sulfone (PES), polyimides (PI), polyfluoroalkoxy alkane (PFA), thermoplastic elastomers, acrylics such as polymethylmethacrylate (PMMA), polypropylene (PP), halogenated polyolefin such as polyvinyl chloride (PVC), polyvinylidene-difluoride (PVDF) and polytetrafluoroethylene (PTFE). In one set of embodiments the outboard layer is selected from the group consisting of PMMA, PVDF, PP and PTFE. PMMA and PVDF are particularly preferred due to low compressibility and low thermal conductivity.

In one set of embodiments the inner layer is a medium or high density polyethylene, and the container further comprises at least two layers outboard of the inner layer wherein the at least two outboard layers are selected from the group consisting of polyester, nylon, polycarbonate, natural rubber, synthetic rubber, phenolic resin, thermpoplastic elastomers, polymethylmethacrylate, polypropylene, halogenated polyolefins such as polyvinyl chloride and polytetrafluoroethylene (PTFE), polyimides and acrylics. In one set of embodiments the layers outboard of the inner layer include a layer of PP or ABS and a layer of plastic selected from PTFE, PVC, PVDF and PMMA.

In one set of embodiments the container wall comprises at least three layers which are preferably contiguous, the inner layer comprising a plastic providing compression heating greater than water, an intermediate layer having a lower compression heating than the inner layer, but medium compressibility, therefore providing compression heating (more than the outer layer) and thermal insulation (better than the inner layer) and a third layer, outboard of the intermediate layer of lower compression heating than the intermediate layer. In one set of embodiments the inner layer is high density polyethylene (HDPE), the intermediate layer is polypropylene (PP) and the layer outboard of the intermediate layer is selected from the group consisting of PMMA, PVC, PET, PES, PI, PVDF and PTFE. In one set of embodiments the layer outboard of the intermediate layer is PMMA or PVDF.

Specific examples of multiwall containers include those containers having a wall comprising layers (from inner progressively to layers more outboard of the inner layer): HDPE/PP/PMMA, HDPE/PP/PVDF, HDPE/PP/PTFE, HDPE/PP, HDPE/PMMA, HDPE/PVDF, HDPE/PP/PEEK, HDPE/PP/PI, HDPE/ABS, HDPE/ABS/PMMA and HDPE/ABS/PVDF.

The multilayer wall preferably comprises a contiguous arrangement of an inner, intermediate and further wall. The walls may be fused or may form a close fitting arrangement of separable layers, for example of different diameter cylindrical layers adapted to be slidably engaged.

The thickness of the layers of the container wall may be selected having regard to the dimensions of the container and the extent of thermal insulation and compression heating required. In one set of embodiments the layers are of thickness in the range of from 1 mm to 50 mm.

The container will generally comprise a side wall and base wall comprising the multilayer constructions. The container wall may be prepared of a variety of shapes and dimensions. In one set of embodiments the container comprises a cylindrical side wall and a closed end wall sealed on the side wall. The cylindrical side wall and preferably also the end wall are of multilayer construction. The container in one set of embodiments is provided with an opening opposite the sealed end wall and from which pressure is applied to a pressure transmission liquid within the container. In a preferred set of embodiments the container opening is provided with a piston which seals against the inside of the container side wall and is movable in response to pressure applied to the piston (so as to apply pressure to the pressure transmission liquid) from outside of the container. The piston may be of singe or multilayer construction and in one set of embodiments comprises a multilayer construction as hereinbefore described. In a preferred set of embodiments the piston is a single layer composed of a compression heating material which may be the same as the inner layer of the container.

Generally it is preferred that the container comprises a cylindrical side wall and an end wall forming the multilayer container adapted to fit into a cylindrical high pressure chamber such as a cylindrical high pressure chamber of larger diameter. The multilayer container is preferably provided with a piston movable within the cylindrical side wall in response to pressure applied externally to the container and within the high pressure chamber. The piston may have a peripheral edge which forms a seal against the side wall of the container. The use of a piston which seals against the inner side of the container side wall prevents entry of pressurization. The piston may be formed of the compression heating plastic present as the inner layer of the container. The piston may also be of multilayer construction but in general we have found a single layer construction to be suitable.

In one set of embodiments there is provided a system for high temperature high pressure processing of a material comprising a container as hereinbefore described, a pressure transmission liquid and the material within the container.

In one set of embodiments the container is housed within a pressure chamber for applying a high pressure to the pressure transmission liquid. The pressure chamber will preferably contain a liquid pressurisation medium separated from the pressure transmission liquid within the container by the piston responsive to pressure exerted by the pressurisation medium to transfer pressure to the pressure transmission liquid and to the material to be processed.

In a further aspect there is provided a process for high pressure thermal processing of a material comprising;
  (i) Providing a multilayer container as herein described;
  (ii) Providing a liquid pressure transmission liquid;
  (iii) Preheating the multilayer container, pressure transmission liquid and material;
  (iv) Placing the material to be processed within the container and providing the pressure transmission liquid within the container in association with the material for applying pressure to the material; and
  (v) Applying pressure to the pressure transmission liquid within the container;
  wherein the inner layer provides compression heating to the pressure transmission liquid and the at least one further layer reduces heat loss from the container.

The preheating temperature used prior to subjecting the container and contents to high pressure processing is determined for the material to be processed and is based on the pressure level and target temperature. The target temperature is in the range of from 40° C. to 150° C. Preferably the preheating temperature will yield process temperatures in the range of from 50° C. to 130° C. and more preferably from 60° C. to 121° C. Pressures during the process may for example be from 100 MPa to 1000 MPa (1000 and 10000 bar) such as 400 MPa to 800 MPa. Pressure hold times can be from 1 second to 30 minutes. In a preferred set of embodiments the pressure is maintained in the range from 30 seconds to 5 minutes. While the preheat temperature will depend on the conditions under which the system will operate, including the pressure, the target temperature and the compression heating properties of processed material, pressurisation fluid and chosen inner layer in one set of embodiments, the preheating temperature is in the range of from 30° C. to 100° C., preferably 40° C. to 90° C. and most preferably 40° C. to 70° C. In one set of embodiments, the pressure transmission liquid is an aqueous liquid, the material is a food product and the preheat temperature is in the range of from 30° C. to 100° C., preferably 40° C. to 90° C. and most preferably 40° C. to 70° C. and the temperature obtained during high pressure processing is in the range of from 40° C. to 150° C., more preferably from 50° C. to 130° C. and most preferably from 60° C. to 121° C.

In a preferred set of embodiments, the temperature of the pressure transmission medium and material is maintained at a temperature of no less than 5° C. less than the target temperature after pressurisation; i.e., during pressure hold time, as a result of compression heating. In this way the system may be operated without the need for additional heating of the container contents through heated high pressure vessel walls or any other form of heating applied externally or implemented in the container, in order to maintain the temperature of the contents at the required level for a longer period than would otherwise be possible.

The container system may be used in treatment of a range of materials for example pharmaceuticals, food products (including liquid, semisolid and solid food products), chemical and/or biological material and reactants for conducting chemical or biological reactions under conditions within the container. The material may, in one set of embodiments, be mixed with, dissolved in or suspended in the pressure transmission liquid.

In a particularly preferred set of embodiments the material to be treated in the container is a food material and the pressure transmission medium is an aqueous medium. In this embodiment the pressure and temperature profile may be provided to obtain pasteurisation or sterilisation of the food product.

Figure 1:
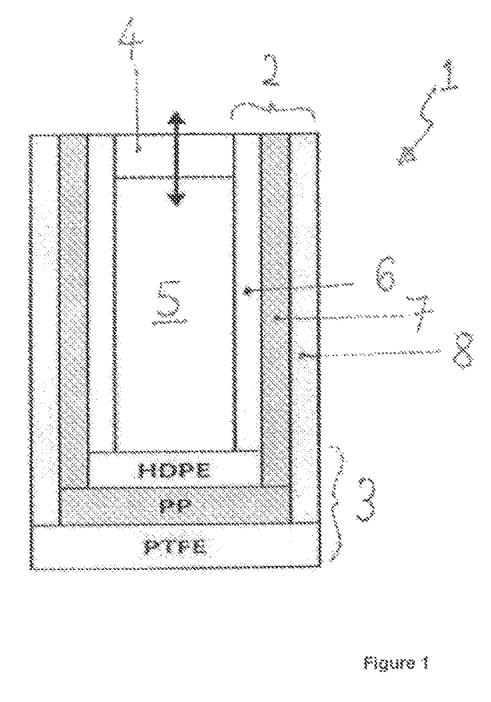
FIG. 1 is a schematic cross section view of a multilayer container in accordance with the invention.

Referring to the drawings there is shown in FIG. 1 a schematic cross section of a container (1) comprising a wall including cylindrical side wall (2), base wall (3) and movable compression piston (4) defining an internal space (5) for receiving a pressure transmission medium and material for high pressure high temperature processing. The side (2) and base wall (3) are formed of three contiguous layers including an inner layer (6) formed of a plastics material, particularly high density polyethylene (HDPE), for compression heating, an intermediate layer (7) having coefficient of compression heating and compressibility (i.e., lower thermal conductivity under pressure) lower than the inner layer, and outer layer (8) of low thermal conductivity such as a thermal conductivity of no more than 0.3 W/(m K), preferably no more than 0.26 W/(m K), at 25° C. and lower compressibility than layers (6) and (7) to maintain low thermal conductivity under pressure. The piston (4) Is formed of plastic for compression heating such as HDPE.

In one set of embodiments the process involves the following steps:
1. preheat a food product, the compression fluid in the container (1) including all layers of the container (6,7 and 8) to the required initial temperature (which may give the target temperature in the pressure transmission liquid and material to be treated after pressurisation); either together or separated;
2. if separated, combine all layers (6,7 and 8) of the container, and fill the internal space (5) with preheated pressure transmission liquid, such as an aqueous liquid, and food product; and close with preheated lid (moving piston) (4), made from the same material as the inside layer in contact with the compression fluid and food product;
3. transfer the container into the high pressure machine;
4. apply high pressure (at target pressure and required pressure hold time) to the container which will lead to piston (4) moving into the container chamber due to pressure gradient and therefore pressurisation of the pressure transmission liquid and material to be processed in the container;
5. release pressure (to ambient pressure);
6. remove container from high pressure machine;
7. unload food product from container.

FIG. 2 shows an embodiment of a system (10) for high pressure thermal processing of a material in a pressure transmission liquid (11) within a cylindrical container (12) having multilayer construction according to FIG. 1 and comprising a base (13), side wall (14) and open end (15). A piston (16) forms a seal with the inner side of the container side wall (14) and is movable within the container (12) in response to pressure applied during processing. The piston is preferably a single layer of material corresponding to the inner layer of the container (12) (see piston (4) and inner layer (6) of FIG. 1).

In operation of the system the container (12) is placed in a pressure vessel (17) having side wall (18), end walls (19, 20) and an opening (21) for a pressure fluid.

In operation pressure fluid (22) is forced under pressure into the pressure vessel (17) via the opening (21) to apply pressure to the container (12) and urge the piston (16) toward the base (13) of the multilayer container (12) thereby applying pressure to the pressure-transmission liquid (11).

Pressure applied to the container (12) and piston (16) via pressure fluid (22) and pressure transmission liquid (11) within the container (12) results in adiabatic heating of the container (12) and in particular the inner layer (FIG. 1 (6)) of the container (12).

The vessel (17) and container (12) may be arranged in any suitable orientation such as horizontal, vertical or other orientation. Suitable pressure vessels and systems for applying pressure to the container are known in the art.

Reference will now be made to experiments that embody the above general principles of the present invention. However, it will be understood that the following description is not to limit the generality of the above description.

EXAMPLES

Example 1: Experimental Study of High Pressure Thermal Processing in a Standard (Cold) High Pressure System Trials were conducted in an Avure 35 L high pressure machine. The temperature of the system was kept at ambient (~18° C.); incoming compression fluid was at ~15° C.

Three container systems were investigated using cylindrical walled container described with reference to FIG. 1 but differing for the comparative example and System 1 in having fewer layers:
Comparative system—one layer only (PTFE);
Invention System 1—two layers (PTFE outer layer, PP inner layer); and
Invention System 2—three layers (PTFE outer layer, PP intermediate layer and HDPE inner layer).

The pressure was set to 600 MPa, pressure hold time was set to 15 min; while a commercial process would rarely go over 5 min (typical is 3 min), the purpose of the extended hold time was to prove the invention under relatively severe case conditions.

The preheating temperature for container material(s) and water inside the container was set to 56-58° C., which gives under pressure (at 600 MPa) a predicted target temperature (at compression heating conditions, I.e., no heat loss during pressurisation) according to Knoerzer et at, *Journal of Food Engineering* 96 (2010) 229-238 and Knoerzer et al, *Journal of Food Engineering*, 98 (2010) 110-119.

Water: 78.5 and 81° C., respectively
PTFE: 78 and 80° C., respectively
PP: 81 and 83° C., respectively
HDPE: 86 and 89° C., respectively As can be seen from this data, the outer layer (PTFE) undergoes least compression heating, slightly less than that of the container content (water), the middle layer (PP) shows compression heating just over that of the container content, whereas the inner layer (HDPE) in contact with the water shows compression heating greater than that of the container content, therefore being capable of not only counteracting heat losses through the insulating properties of the material but at the same time act as internal heater, further counteracting temperature loss during pressure hold time.

Figure 3:
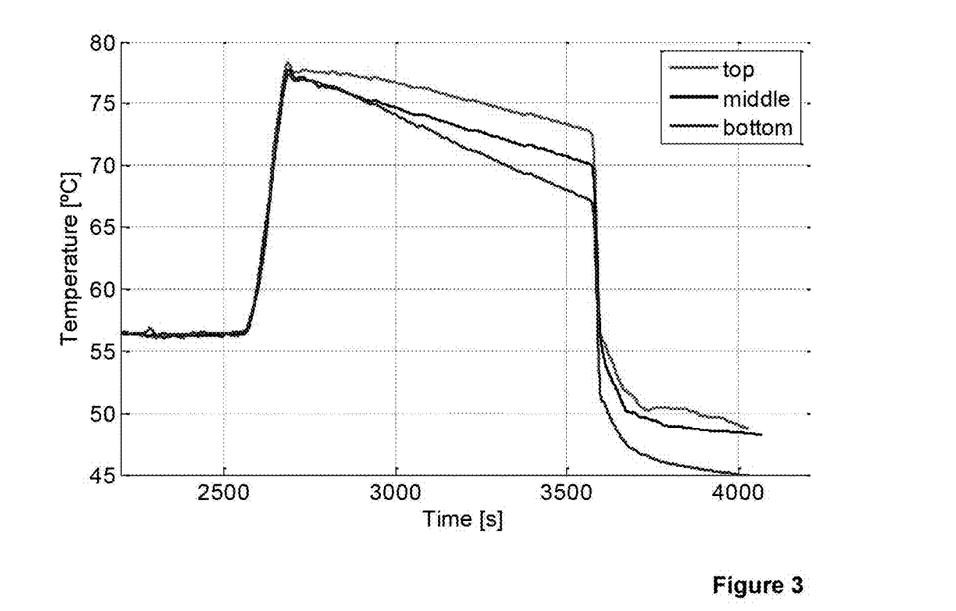
FIG. 3 is a graph showing the variation in temperature of water (used as the pressure transmission liquid) with time at the top, middle and bottom of a single walled PTFE container during high pressure thermal processing for 15 min.
Figure 4:
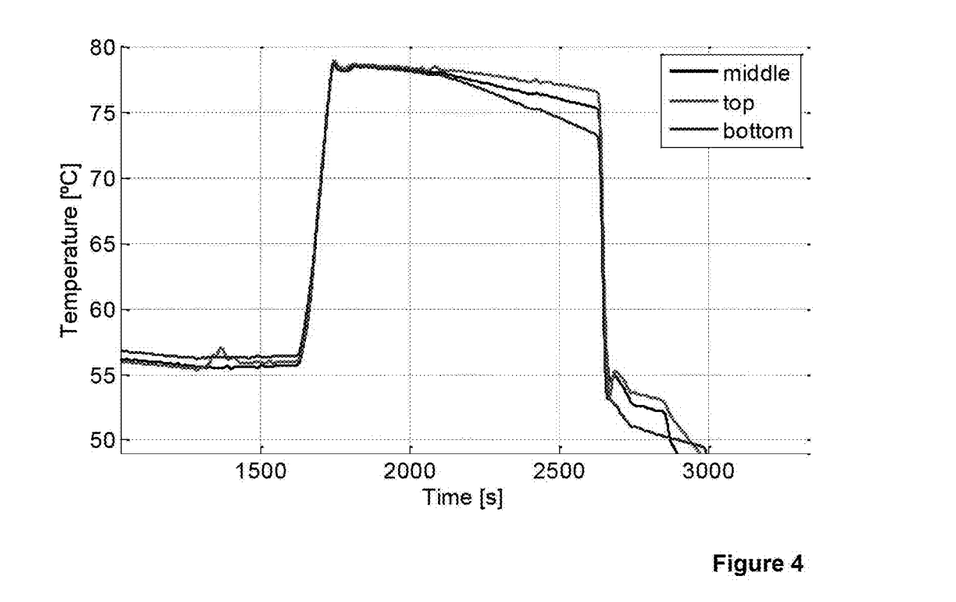
FIG. 4 is a graph showing the variation in temperature of water (used as the pressure transmission liquid) with time at the top, middle and bottom of a two layer (PTFE outer layer PP inner layer) container in accordance with the invention during high pressure thermal processing for 15 min.
Figure 5:
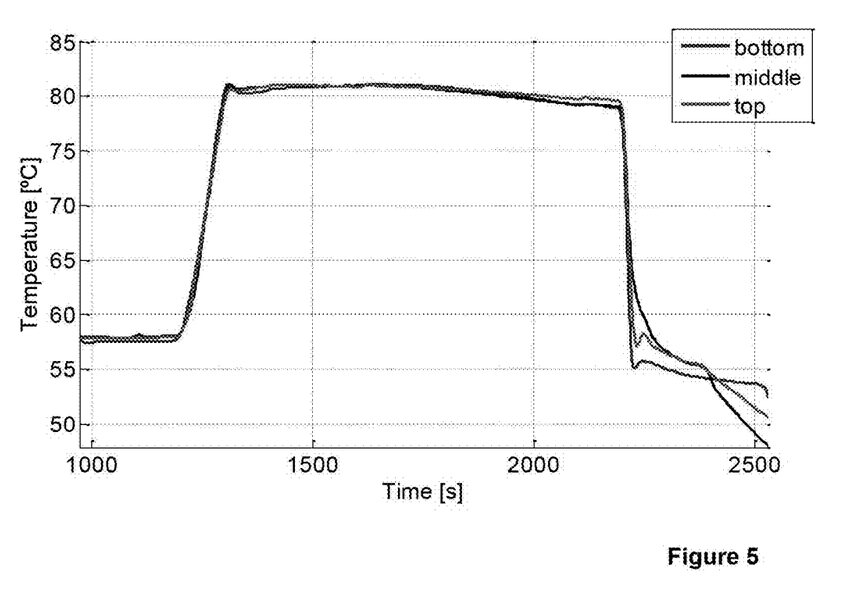
FIG. 5 is a graph showing the variation in temperature of water (used as the pressure transmission liquid) with time at the top, middle and bottom of a three layer (PTFE outer layer, PP centre layer and HDPE inner layer) container in accordance with the invention during high pressure thermal processing for 15 min.

FIGS. 3, 4 and 5 show the temperature profiles obtained inside the container throughout the process at top, middle and bottom location in the container, using a thermo-egg, a pressure and temperature stable data logger, as described in Knoerzer et al, *Food Engineering Reviews* 2 (2010) 216-225, for 1-layer configuration (PTFE), 2-layer configuration (PTFE, PP) and 3-layer configuration (PTFE, PP, HDPE), respectively. In FIGS. 3 to 9 when the plots separate in the high temperature region of the plots, the top, middle and bottom container locations correspond with the top, middle and lower plots respectively.

As can be seen in FIG. 3, while the target temperature can almost be reached at the end of pressure come-up, apart from the top location, temperatures are dropping almost instantly after commencement of pressure hold time. The top location is able to hold it for about 1-2 min, as warmer water rises to the top while colder water moves to the bottom due to density differences of the water at different temperatures. This eventually leads to pronounced density stratification, and significant differences in temperature of up to 6° C. from top to bottom, and an overall maximum loss of temperature of almost 12° C. in the bottom location. The cause of the heat losses is due to thermal conduction through the PTFE layer and the pronounced temperature gradient between container content and outside compression fluid and vessel walls of >60° C. This single layer configuration may be suitable for high pressure processing at only slightly elevated temperatures and only very short hold times.

FIG. 4 shows a better retention of the heat. The target temperature of ~79° C. is reached and then held for about 5 min into the process (~0.5° C. is lost during that time, but distribution is still uniform). After that, density stratification occurs and temperature differences from top to bottom of >3° C. develop; overall temperature loss at the end of pressure hold time in the coldest location is >5° C.

FIG. 5 shows very good retention of temperature even at the end of pressure hold time, i.e., after 15 min, which is significantly longer than any economically feasible high pressure process. A maximum of ~1° C. is lost in the coldest spot. Temperatures are still uniform and at target temperature 10 min into pressure hold-time. A slight increase in temperature can be seen during the first few minutes, which is caused by the higher temperature of the inner layer (HDPE) which proves the function of this layer to act as internal heater.

These examples prove the concept of the multi-layered container concept, which can, depending on the process conditions required for a specific application, be used in single, double and triple layer configuration.

Example 2: Numerical Modelling Study to Prove that Invention Works for the Purpose of High Pressure Thermal Processing in a Standard (Cold) High Pressure System A numerical modelling study was conducted using a commercial software package, COMSOL Multiphysics (COMSOL AB, Stockholm, Sweden) to evaluate the potential of retaining heat at temperatures up to common sterilisation temperature (i.e., 121° C.). The applied procedure was as described, e.g., in Knoerzer et al. AIChE Journal 2007 Vol. 53 No11, 2996-3010 and Knoerzer and Chapman, *Journal of Food Engineering*, 104 (2011) 404-413.

The following process conditions were selected:

Initial temperature (before pressure): 90° C.

Target pressure: 600 MPa

Target temperature under pressure (following compression heating):

Water: 120.6° C.

PTFE: 114° C.

PP: 119° C.

HDPE: 126° C.

Hold time: 5 min

Natural convection in fluid domain (i.e., process fluid in container)

Heat transfer through conduction and convection

Surrounding temperature (i.e., on outside of outer layer): 20° C.

It was found that the 1-layer configuration shows significant heat loss and the development of density stratification (i.e., cold area at bottom, warmer area at top of the container). This can is also seen to some extent for the 2-layer configuration, albeit significantly less pronounced.

The 3-layer configuration shows uniform temperature distribution close to the target temperature of 120.6° C. even at the end of pressure hold time.

Table 3 shows the average, maximum and minimum temperatures in the container at the end of pressure hold time for the three scenarios. The 1-layer configuration (only PTFE) leads to a loss of temperature in the coldest point of 25.6° C. and in average to a loss of 16.7° C., caused to some extent by the cooler container wall to start with as the maximum compression heating of PTFE is lower than that of the contained water, but then also due to significant thermal losses through conduction and convection during pressure hold time.

This is significantly less pronounced for the 2-layer configuration (PP inner layer/PTFE outer layer), which shows an average heat loss of only 2.6° C., and a maximum heat loss (at the bottom of the container) of 8.6° C.

The 3-layer configuration (HDPE inner layer/PP intermediate/PTFE outer layer) retains the heat best, with an average temperature drop of only 0.6° C. and a maximum temperature drop of 2.6° C.

TABLE 3

Average, maximum and minimum temperatures in the
container for a high pressure thermal process at 600 MPa, target
temperature of 120.6° C. and after 5 min hold time.

|  | $T_{average\ in\ water}$ | $T_{max}$ | $T_{min}$ |
|---|---|---|---|
| PTFE | 103.9° C. | 109° C. | 95° C. |
| PP/PTFE | 118° C. | 120° C. | 112° C. |
| HDPE/PP/PTFE | 120° C. | 120.5° C. | 118° C. |

Also this example demonstrates the concept of the container and its use for high pressure thermal processing in a standard (cold) high pressure machine, even at very high temperature gradients of ~100° C. between container content and compression fluid and high pressure vessel wall outside the container.

Example 3: Experimental Study of High Pressure Thermal Processing in a Standard (Cold) High Pressure System at Commercial Sterilisation Temperatures Trials were conducted in an Avure 35 L high pressure machine. The temperature of the system was kept below ambient (~18° C.); incoming compression fluid was at ~12° C.

Three container systems were investigated using cylindrical walled container:
  Invention System 4—two layers (PTFE outer layer, PE inner layer); and
  Invention System 5—three layers (PTFE outer layer, PP intermediate layer and HDPE inner layer).
  Invention System 6—three layers (PVC outer layer, PP intermediate layer and HDPE inner layer).

The pressure was set to 600 MPa, pressure hold time was set to 15 min; while a commercial process would rarely go over 5 min (typical is 3 min), the purpose of the extended hold time was to prove the invention under relatively severe case conditions.

The preheating temperature for container material(s) and water inside the container was set to ~94° C., which gives under pressure (at 600 MPa) a predicted target temperature (at compression heating conditions, i.e., no heat loss during pressurisation) according to compression heating characteristics as determined following the procedure described in Knoerzer et al, Journal of Food Engineering, 98 (2010) 110-119.
  Water: 124.5° C., respectively
  PTFE: 118° C., respectively
  PVC: 115° C., respectively
  PP: 123.4° C., respectively
  HDPE: 130.5° C., respectively As can be seen from this data, the outer layer (PTFE) undergoes least compression heating, less than that of the container content (water), the middle layer (PP) shows compression heating just under that of the container content, whereas the inner layer (HDPE) in contact with the water shows compression heating greater than that of the container content, therefore being capable of not only counteracting heat losses through the insulating properties of the material but at the same time act as internal heater, further counteracting temperature loss during pressure hold time.

Figure 6:
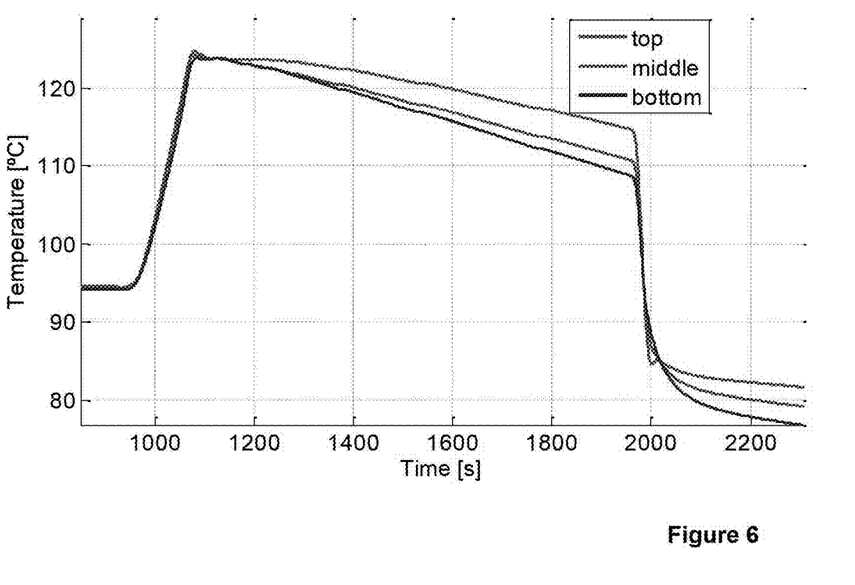
FIG. 6 is a graph showing the variation in temperature of water (used as the pressure transmission liquid) with time at the top, middle and bottom of a two layer (PTFE outer layer HDPE inner layer) container in accordance with the invention during high pressure thermal processing at a target sterilisation temperature for 15 min.
Figure 7:
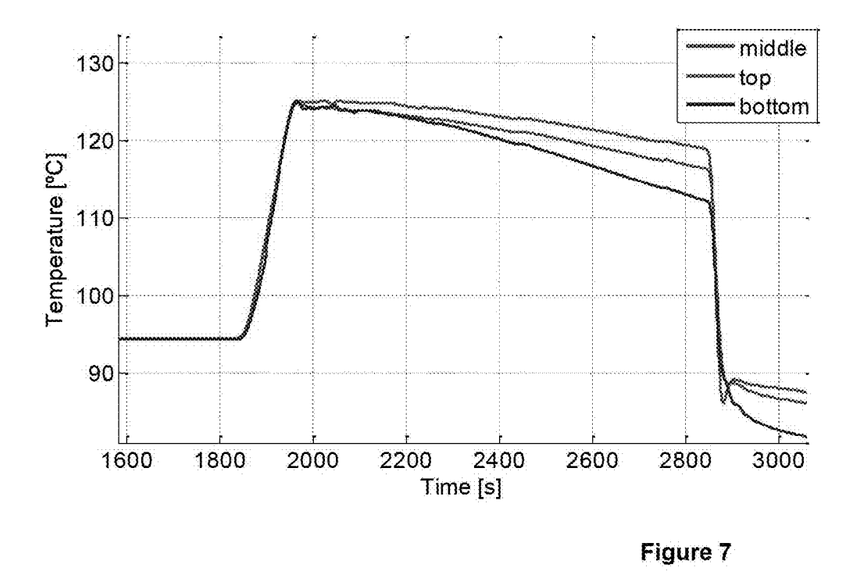
FIG. 7 is a graph showing the variation in temperature of water (used as the pressure transmission liquid) with time at the top, middle and bottom of a three layer (PTFE outer layer, PP centre layer and HDPE inner layer) container in accordance with the invention during high pressure thermal processing at a target sterilisation temperature for 15 min.
Figure 8:
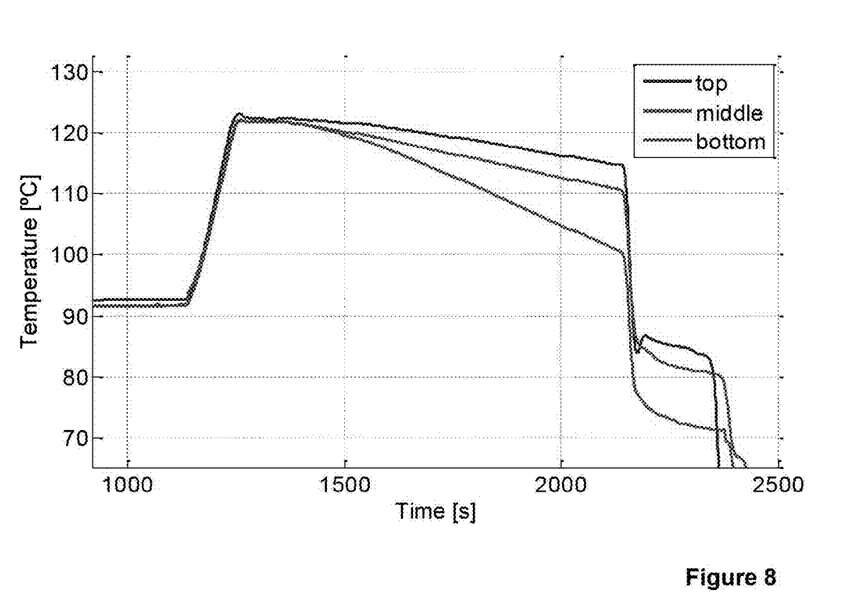
FIG. 8 is a graph showing the variation in temperature of water (used as the pressure transmission liquid) with time at the top, middle and bottom of a three layer (PVC outer layer, PP centre layer and HDPE inner layer) container in accordance with the invention during high pressure thermal processing at a target sterilisation temperature for 15 min.

FIGS. 6, 7 and 8 show the temperature profiles obtained inside the container throughout the process at top, middle and bottom location in the container, using a thermo-egg, a pressure and temperature stable data logger, as described in Knoerzer et al, Food Engineering Reviews 2 (2010) 216-225, for Invention Systems 4, 5 and 6, respectively. When the plots separate in the high temperature region of the plots, the top, middle and bottom container locations correspond with the top, middle and lower plots, respectively.

As can be seen in FIG. 6, the target temperature is reached at the end of pressure come-up, and temperatures can be held above 121° C. (target temperature for commercial thermal sterilisation) for >3 min (which is sufficient for a commercially feasible process); after approximately 5 min, the middle and bottom location have lost about 3.5° C.; beyond 5 min, the temperatures in the middle and top location drop below commercial sterilisation temperatures. The continuing temperature loss eventually leads to pronounced density stratification, and significant differences in temperature of >6° C. from top to bottom, and an overall maximum loss of temperature of about 15° C. in the bottom location at the end of the 15 min hold time.

FIG. 6 shows a significantly better retention of the heat at commercial sterilisation temperatures. The target temperature of ~124° C. (at starting temperature of 94° C.)*is reached, and after 5 min into the process, less than 1° C. is lost at the top, and only about 2.5° C. Is lost at bottom and middle location; still at a temperature greater than commercial sterilisation temperatures. Following that, density stratification occurs and temperature differences from top to bottom of around 6° C. develop; overall temperature loss at the end of pressure hold time in the coldest location is >12° C. While this sounds significant, one has to remember that the temperature difference between content and HPP machine is >100° C. This also compares well to Example 2 (numerical modelling study); note the differences in preheating and therefore target temperatures at process start of ~4° C.

TABLE 4

Comparison of model and experiment at sterilisation
temperatures after 5 min hold time (Ttarget, model = 120.6° C.;
Ttarget, experiment = 124.5° C.).

|  | Tinitial | Tmax/top | Tmin/bottom | ΔTtop | ΔTbottom |
|---|---|---|---|---|---|
| Modelling study | 120.6° C. | 120.5° C. | 118° C. | 0.1° C. | 2.6° C. |
| Experimental study | 124.8° C. | 124.2° C. | 122.2° C. | 0.6° C. | 2.6° C. |

FIG. 8 shows the same process with 3 layers, but with the outer PTFE layer replaced with a PVC layer. Initial temperatures were somewhat lower at around 92° C., hence, target temperature in the content was also lower at 122° C. A similar behaviour can be seen, albeit at a slightly higher heat loss over the course of the pressure hold time. Also heat losses after 5 min are somewhat greater, yet commercial sterilisation temperatures can be held for 5 min.

These examples further prove the concept of the multilayered container concept, which can, depending on the process conditions required for a specific application, be used in various layer configurations (both from a number of layers as well as layer material perspective).

Example 3: Experimental study of high pressure thermal processing in a standard (cold) high pressure system at commercial pasteurisation temperatures Trials were conducted in an Avure 35 L high pressure machine. The temperature of the system was kept below ambient (~18° C.); incoming compression fluid was at ~12° C.

One container systems was investigated using cylindrical walled container:

Invention System 7—three layers (PTFE outer layer, PP intermediate layer and HDPE inner layer).

The pressure was set to 600 MPa, pressure hold time was set to 15 min; while a commercial process would rarely go over 5 min (typical is 3 min), the purpose of the extended hold time was to prove the invention under relatively severe case conditions.

The preheating temperature for container material(s) and water inside the container was, set to ~94° C., which gives under pressure (at 600 MPa) a predicted target temperature (at compression heating conditions, i.e., no heat loss during pressurisation) according to compression heating characteristics as determined following the procedure described in Knoerzer et al, Journal of. Food Engineering, 98 (2010) 110-119.

Water: 93.7° C., respectively
PTFE: 92.8° C., respectively
PP: 94.6° C., respectively
HDPE: 101.2° C., respectively As can be seen from this data, the outer layer (PTFE) undergoes least compression heating, slightly less than that of the container content (water), the middle layer (PP) shows compression heating slightly greater than that of the container content, whereas the inner layer (HDPE) In contact with the water shows compression heating significantly greater than that of the container content therefore being capable of not only counteracting heat losses through the insulating properties of the material but at the same time act as internal heater further counteracting temperature loss during pressure hold time.

Figure 9:
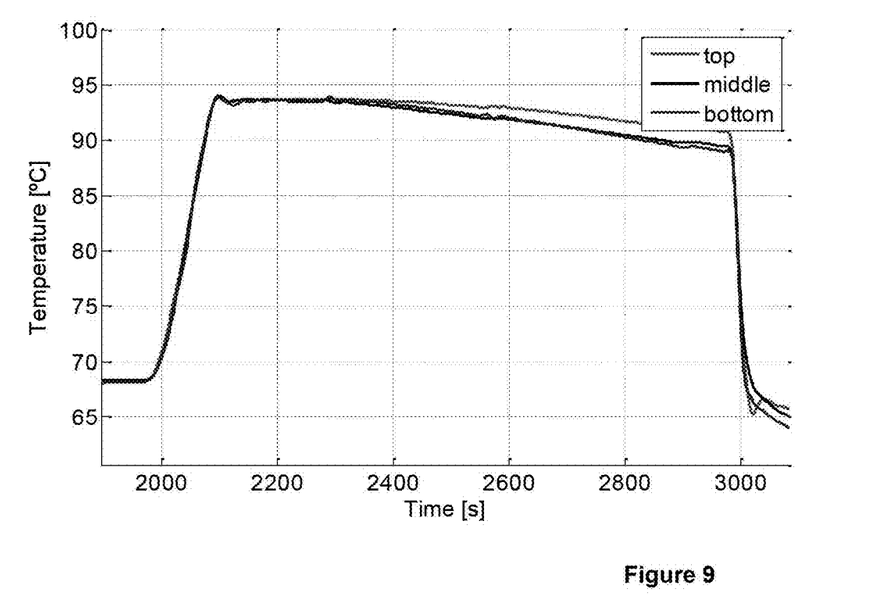
FIG. 9 is a graph showing the variation in temperature of water (used as the pressure transmission liquid) with time at the top, middle and bottom of a three layer (PTFE outer layer, PP centre layer and HDPE inner layer) container in accordance with the invention during high pressure thermal processing at a target pasteurisation temperature for 15 min.

FIG. 9 shows the temperature profiles obtained inside the container throughout the process at top, middle and bottom location in the container, using a thermo-egg, a pressure and temperature stable data logger, as described in Knoerzer et al, Food Engineering Reviews 2 (2010) 216-225, for Invention System 7. When the plots separate towards the end of the pressure hold time, the top, middle and bottom container locations correspond with the top, middle and lower plots, respectively.

As can be seen in FIG. 9, the target temperature is reached at the end of pressure come-up, and temperatures can be held above 90° C. (target temperature for commercial thermal pasteurisation) for almost the entire hold time of 15 min. Virtually negligible drop in temperature are observed within the commercial feasible 3-5 min pressure hold time. Density stratification can be seen to some extent towards the end of the pressure hold time, with differences in temperatures of less than 2° C. from top to bottom, and an overall maximum loss of temperature of about 4.5° C. in the bottom location at the end of the 15 min hold time; which is remarkable given the temperature difference between container content and pressure medium entering the HPP vessel of about 80° C.

This example further proves the concept of the multi-layered container concept for commercial thermal pasteurisation temperatures.

The invention claimed is:

1. A multilayer container configured to be used in a pressure vessel operating at elevated temperature for high pressure elevated temperature processing of a material within the container, using an aqueous pressure transmission liquid within the container and a pressurization medium in the pressure vessel outside the multilayer container, the multilayer container having a container wall comprising as contiguous plastics layers, an inner layer formed of a plastic for containing the aqueous pressure transmission liquid in contact with an inner side of the inner layer, an intermediate layer and a layer outboard of the intermediate later layer, wherein
   (a) the inner layer is of polyethylene having a compression heating coefficient greater than a compression heating coefficient of the aqueous pressure transmission liquid in contact with the inner side of the inner layer to transfer heat from the inner layer to the aqueous pressure transmission liquid during high pressure processing;
   (b) the intermediate layer is of polypropylene or ABS and the intermediate layer having a lower thermal conductivity than the inner layer, a lower compression heating coefficient than the inner layer and a higher compression heating coefficient than the aqueous pressure transmission liquid; and
   (c) the outboard layer, which is free of PVC, has a compression heating coefficient that is lower than the compression heating coefficient of the inner layer and, the outboard layer having a thermal conductivity of no more than 0.25 $W \cdot m^{-1} \cdot K^{-1}$ to provide thermal insulation to reduce heat loss from the container; and wherein the container wall comprises a cylindrical side wall and an end wall, that is sealed to the cylindrical side wall, is provided with a piston having a peripheral edge which seals with the container cylindrical side wall whereby the aqueous pressure transmission liquid and the material are separated from the pressurization medium outside the container, the piston being movable within the container cylindrical side wall in response to a change in pressure applied to the piston by the pressurization medium outside of the container to apply pressure to the aqueous pressure transmission liquid within the container during high pressure processing.

2. The multilayer container according to claim 1, wherein the inner layer has a compression heating coefficient at ambient temperature and ambient pressure of at least $6 \times 10^{-11}$ $Pa^{-1}$.

3. The multilayer container according to claim 1, wherein the compressibility of the outboard layer is no more than $2.0 \times 10^{-10}$ $Pa^{-1}$.

4. The multilayer container according to claim 1, wherein the inner layer is formed of high density polyethylene.

5. The multilayer container according to claim 4, wherein the outboard layer is selected from the group consisting of polypropylene, PTFE, PMMA, and PVDF.

6. The multilayer container according to claim 1, wherein the intermediate layer has a thermal conductivity, compressibility and compression heating coefficient that is higher than the outboard layer.

7. The multilayer container according to claim 1, wherein the inner layer is formed of HDPE and the intermediate layer is formed of polypropylene.

8. The multilayer container according to claim 1, wherein each of the inner, intermediate and outboard layers are of thickness in the range of from 1 mm to 50 mm.

9. The multilayer container according to claim 1, wherein the material to be processed is a food material.

10. The multilayer container according to claim 1, wherein there is no ohmic or electrical heating within the container or from outside of the container.

11. The multilayer container according to claim 1, wherein the piston is of single or multilayer construction and comprises the same material as the inner layer of the container.

12. The multilayer container according to claim 1, wherein the contiguous layers are different diameter cylindrical side wall layers which are separable and slidably engaged.

13. A system for high pressure thermal processing of a material, comprising the multilayer container according to claim 1, wherein the aqueous pressure transmission liquid and the material are within the container.

14. The system according to claim 13, wherein the container is housed within the pressure vessel for applying pressure to the aqueous pressure transmission liquid, and wherein the pressure vessel contains the liquid pressurization medium separated from the aqueous pressure transmission liquid within the container by the piston and the piston is responsive to pressure exerted by the pressurization medium to transfer pressure to the aqueous pressure transmission liquid.

15. A process for high pressure thermal processing of a material comprising:
(i) providing the multilayer container according to claim 1;
(ii) providing the aqueous pressure transmission liquid and the material;
(iii) preheating the multilayer container, the aqueous pressure transmission liquid and the material;
(iv) placing the material to be processed within the container and providing the aqueous pressure transmission liquid within the container in association with the material for applying pressure to the material; and
(v) applying pressure to the aqueous pressure transmission liquid within the container;

wherein the inner and intermediate layers together provide compression heating to the aqueous pressure transmission liquid and the outboard layer reduces heat loss from the container.

16. The process according to claim 15, wherein the multilayer container, the aqueous pressure transmission liquid and the material are preheated to a temperature in the range of from 40° C. to 150° C. and the pressure applied is in the range of from 100 to 1000 MPa.

17. The process according to claim 16, wherein the pressure is maintained in the range for a period of 1 second to 30 minutes.

18. The process according to claim 15, wherein the material is a food material.

* * * * *